United States Patent
Kim et al.

(10) Patent No.: US 9,230,543 B2
(45) Date of Patent: Jan. 5, 2016

(54) METHOD AND APPARATUS FOR PROVIDING CONTENTS ABOUT CONVERSATION

(75) Inventors: Hyun Kim, Daejeon (KR); Kang Woo Lee, Daejeon (KR); Young Ho Suh, Gwangju (KR); Hyoung Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 680 days.

(21) Appl. No.: 13/592,615

(22) Filed: Aug. 23, 2012

(65) Prior Publication Data

US 2013/0159003 A1    Jun. 20, 2013

(30) Foreign Application Priority Data

Dec. 20, 2011    (KR) .......................... 10-2011-0138425

(51) Int. Cl.
| | | |
|---|---|---|
| *G10L 15/04* | (2013.01) | |
| *G10L 15/18* | (2013.01) | |
| *G10L 25/54* | (2013.01) | |
| *G06F 17/30* | (2006.01) | |
| *G10L 15/08* | (2006.01) | |

(52) U.S. Cl.
CPC ...... *G10L 15/1822* (2013.01); *G06F 17/30746* (2013.01); *G10L 25/54* (2013.01); *G10L 2015/088* (2013.01)

(58) Field of Classification Search
USPC ..................... 704/231–257, 27, 275
See application file for complete search history.

(56) References Cited

U.S. PATENT DOCUMENTS

| | | | |
|---|---|---|---|
| 6,195,635 B1 * | 2/2001 | Wright ........................... | 704/231 |
| 7,263,551 B2 | 8/2007 | Belfiore et al. | |
| 7,676,369 B2 * | 3/2010 | Fujimoto et al. ............... | 704/270 |
| 2008/0235018 A1 * | 9/2008 | Eggen et al. ................... | 704/251 |
| 2010/0179811 A1 * | 7/2010 | Gupta et al. ................... | 704/235 |

FOREIGN PATENT DOCUMENTS

| | | |
|---|---|---|
| JP | 2009-087340 A | 4/2009 |
| KR | 10-2006-0070605 A | 6/2006 |
| KR | 10-2009-0000637 A | 1/2009 |

\* cited by examiner

*Primary Examiner* — Abul Azad
(74) *Attorney, Agent, or Firm* — Rabin & Berdo, P.C.

(57) ABSTRACT

Disclosed are a method and an apparatus for providing contents about conversation, which collect voice information from conversation between a user and another person, search contents on the basis of the collected voice information, and provide contents about the conversation between the user and the person. The method of providing contents about conversation includes: a voice information collecting step of collecting voice information from conversation between a user and another person; a keyword creating control step of creating search keywords by using the collected voice information; and a contents providing control step of searching contents by using the created search keywords, and providing the searched contents.

10 Claims, 3 Drawing Sheets

METHOD AND APPARATUS FOR PROVIDING CONTENTS ABOUT CONVERSATION

CROSS-REFERENCE TO RELATED APPLICATIONS

This application claims priority to and the benefit of Korean Patent Application No. 10-2011-0138425 filed in the Korean Intellectual Property Office on Dec. 20, 2011, the entire contents of which are incorporated herein by reference.

TECHNICAL FIELD

The present invention relates to a method and an apparatus for providing contents about conversation. More particularly, the present invention relates to a method and an apparatus for providing contents about conversation, which collect voice information from conversation between a user and another person, search contents on the basis of the collected voice information, and provide contents about the conversation between the user and the person.

BACKGROUND ART

Recently, an application technology based on voice recognition that performs necessary functions by recognizing words or simple sentences corresponding to voice commands is used in many fields. In the United States, companies relating to computers and communication, such as IBM, AT&T and Lucent Technologies, and Microsoft have developed independent large capacity voice recognition systems and have applied the systems to relative products of the companies.

Many universities and institutes, including Carnegie Mellon University (CMU) and Massachusetts Institute Of Technology (MIT) and Cambridge University in England, have studied voice recognition.

Voice recognition technologies have also been studied in Korea by national institutes, company institutes, and universities, including Electronics and Telecommunications Research Institute (ETRI).

In spite of many researches, the present voice recognition technologies have difficulty in understanding conversation between a user and another person due to many problems, such as the user's pronunciation, noise in the environment, and processing of the natural language, and in actively providing contents or services about the conversation between the user and the person at the present technological level.

SUMMARY OF THE INVENTION

The present invention has been made in an effort to provide a method and an apparatus for providing contents about conversation, which collect voice information from conversation between a user and another person, search contents on the basis of the collected voice information, and provide contents to the user.

An exemplary embodiment of the present invention provides a method of providing contents about conversation, including: a voice information collecting step of collecting voice information from conversation between a user and another person; a keyword creating control step of creating search keywords by using the collected voice information; and a contents providing control step of searching contents by using the created search keywords, and providing the searched contents.

The voice information collecting step may include: a voice information input step of receiving voice information from the conversation between the user and the person; and an end point detection (EPD) detecting step of detecting the end point of the start of the utterance to find out sections of a sentence unit from the input voice information.

The voice information collecting step may further include a sentence division collecting step of dividing the voice information in a sentence unit in accordance with the end point of the start of the conversation detected in the EPD detecting step, and collecting the voice information divided in a sentence unit.

The keyword creating control step may include a morpheme extracting step of extracting morphemes from the collected voice information.

The keyword creating control step may further include a subject word extracting step of extracting subject words relating to the conversation subject between the user and the person from the morphemes extracted in the morpheme extracting step, based on ontology.

The keyword creating control step may further include a subject word mapping step of mapping the subject words extracted in the subject word extracting step into representative words corresponding to the meanings of the subject words.

The keyword creating control step may further include a search keyword creating step of selecting a point word from the mapped words and creating search keywords for contents by using the selected point word, in consideration of at least one of the relationship between the mapped words in the subject words mapped as the representative words in the subject word mapping step and the frequency in use of the subject words.

The contents providing control step may include a contents searching step of searching the contents, based on a driving engine based on ontology, by using the created search keywords.

The contents providing control step may further include a contents providing step of asking the user in character or voice whether to be provided with the searched contents when there are contents searched in the contents searching step, and of providing the searched contents when the user consents to be provided with the searched contents.

Another exemplary embodiment of the present invention provides an apparatus for providing contents about conversation, including: a voice information collecting unit configured to collect voice information from conversation between a user and another person; a keyword creating control unit configured to create search keywords by using the collected voice information; and a contents providing control unit configured to search contents by using the created search keywords, and provide the searched contents.

The voice information collecting unit may include: a voice information input unit configured to receive voice information from the conversation between the user and the person; and an EPD detecting unit configured to detect the end point of the start of the conversation to find out sections of a sentence unit from the input voice information.

The voice information collecting unit may further include a sentence division collecting unit configured to divide the voice information in a sentence unit in accordance with the end point of the start of the conversation detected by the EPD detecting unit, and collect the voice information divided in a sentence unit.

The keyword creating control unit may include a morpheme extracting unit configured to extract morphemes from the collected voice information.

The keyword creating control unit may further include a subject word extracting unit configured to extract subject words relating to the conversation subject between the user and the person from the morphemes extracted by the morpheme extracting unit, based on ontology.

The keyword creating control unit may further include a subject word mapping unit configured to map the subject words extracted by the subject word extracting unit into representative words corresponding to the meanings of the subject words.

The keyword creating control unit may further include a search keyword creating unit configured to select a point word from the mapped words and create search keywords for contents by using the selected point word, in consideration of at least one of the relationship between the mapped words in the subject words mapped as the representative words by the subject word mapping unit and the frequency in use of the subject words.

The contents providing control unit may include a contents searching unit configured to search the contents, based on a search engine based on ontology, by using the created search keywords. The contents providing control unit may further include a contents providing unit configured to ask the user in character or voice whether to be provided with the searched contents when there are contents searched in the contents searching unit, and provide the searched contents when the user consents to be provided with the searched contents.

According to the exemplary embodiments of the present invention, it is possible to promote convenience of a user and improve the quality of life by actively providing a user with contents relating to conversation between the user and another person.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
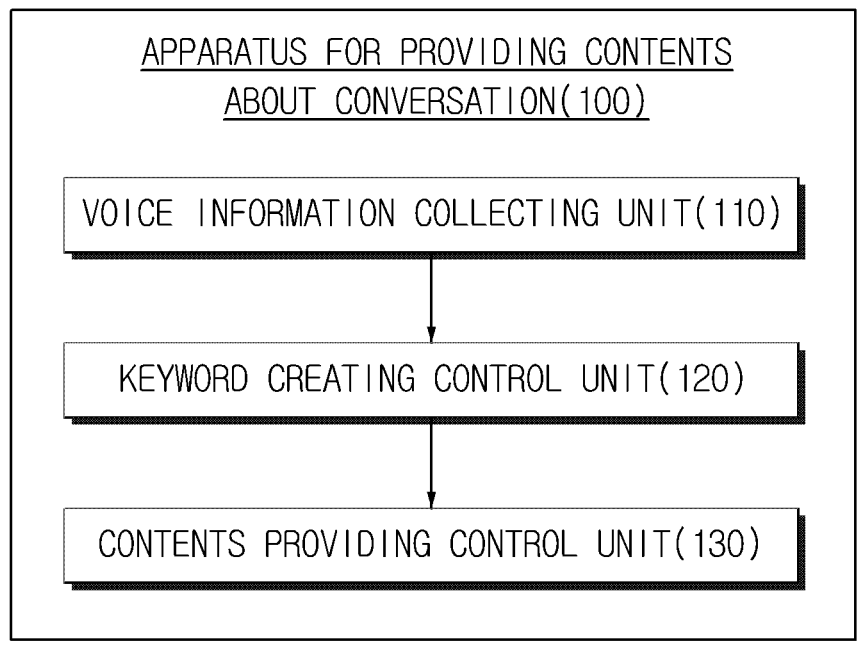
FIG. 1 is a block diagram of an apparatus for providing contents about conversation according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

FIG. 1 is a block diagram of an apparatus for providing contents about conversation according to an exemplary embodiment of the present invention.

Describing an apparatus 100 for providing contents about conversation with reference to FIG. 1, the apparatus 100 for providing contents about conversation includes a voice information collecting unit 110, a keyword creating control unit 120, and a contents providing control unit 130.

The voice information collecting unit 110 collects voice information from conversation between a user and another person. The user is a person who uses the apparatus 100 for providing contents about conversation. When there is conversation between the user and another person, the voice information collecting unit 110 continuously collects voice information from the conversation.

The contents about conversation means contents including information, such as documents, music, video, posters, photographs, or pictures, associated with the content or subject of conversation between a user and another person.

Figure 2:
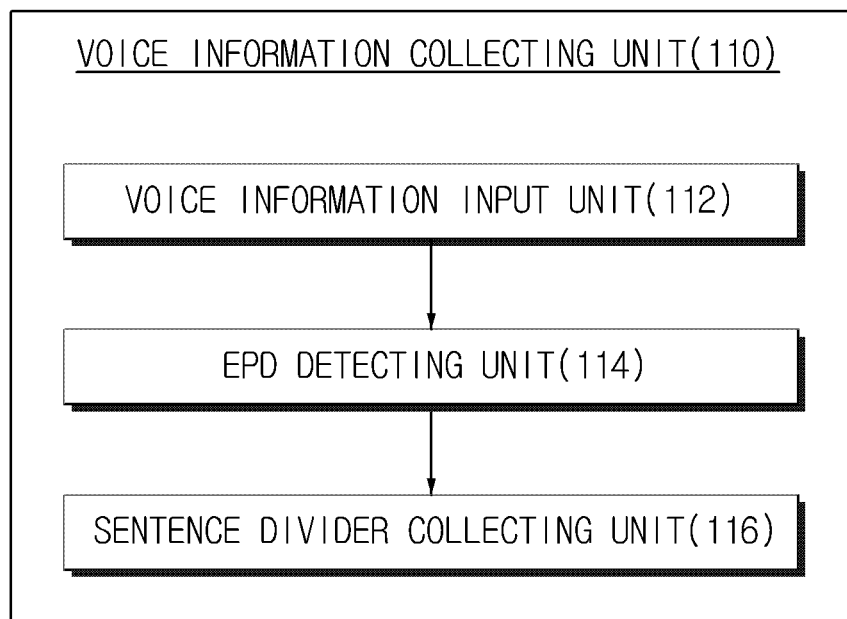
FIG. 2 is a block diagram of a voice information collecting unit in the apparatus for providing contents about conversation according to the exemplary embodiment of the present invention.

FIG. 2 is a block diagram of a voice information collecting unit in the apparatus for providing contents about conversation according to the exemplary embodiment of the present invention.

Describing the voice information collecting unit 110 in detail with reference to FIG. 2, the voice information collecting unit 110 includes a voice information input unit 112, and EPD detecting unit 114, and a sentence division collecting unit 116.

The voice information input unit 112 receives voice information from conversation between a user and another person. The voice information collecting unit 110 continuously receives voice information while there is conversation between the user and the person. The voice information collecting unit 110 receives the voice information based on a voice recognition technology, and generally, the voice recognition technology receives voice of a person by recognizing the voice as a frequency domain.

The voice information input to the voice information input unit 112 may be input incorrectly or not be input in accordance with the conversation environment, the pronunciation of the user or the person, the magnitude of the voice of the user or the person, or the distance between the voice information collecting unit 110 and the user or the person.

The voice information collecting unit 110 continuously receives the voice information while the conversation continues, and continuously receives the voice information from the conversation even if the voice information is input incorrectly or not input. The voice information input unit 112 continuously collects voice information while the conversation continues, thereby complementing the case where the voice information is input incorrectly or not input.

The EPD detecting unit 114 detects the end point of the start of utterance to find the section of a sentence unit from the voice information input from the voice information collecting unit 110.

In detail, the EPD detecting unit 114 finds when an input value for a predetermined time is lower than a predetermined value from the voice information continuously input from the voice information collecting unit 110 while there is conversation. That is, the EPD detecting unit 114 determines the cases when the input value for a predetermined time is lower than the predetermined value and the speaker of the conversation changes, as the point where a sentence ends. Detecting the end point of the start of utterance to find the section of a sentence unit is called end point detection (EPD).

The method of EPD is not limited to finding the point where an input value for a predetermined time is lower than a predetermined value, but may include all methods of detecting the end point of the start of utterance to find the section of a sentence unit.

The sentence divider collecting unit 116 collects voice information input from conversation between a user and another person as divided sentences, by dividing the sentences in accordance with the end point of the start of the utterance detected from the EPD detecting unit 114.

Alternatively, the sentence divider collecting unit 116 may collect voice information as divided sentences by appropriately changing the voice information input from the voice information collecting unit 110 into the sentences, using a specific database or algorithm.

For example, when a user and another person have conversation, "What did we eat for lunch at school today?" and "We ate fried eggs and brown seaweed soup", and when the voice information collecting unit 110 receives "What did we eat for lunch in school today?" for "What did we eat for lunch at school today?", the voice information collecting unit 110 may appropriately change "in school" into "at school" and collect the changed sentence. The change may be applied only for postpositional words and may be performed on the basis of ontology.

When changing voice information into a type of sentence and collecting the sentence, it is possible to make more accurate determination in acquiring main words and finding the relationship between the words and the meaning of the words.

However, the voice information input from the conversation between the user and the person need not be necessarily collected as divided sentences. The sentence divider collecting unit 116 collects the voice information as sentences when the unit 116 may acquire sentences from the voice information input from the voice information collecting unit 110, and the sentence divider collecting unit 116 collects the voice information input from the voice information collecting unit 110, as it is, when the unit 116 may not acquire sentences from the voice information input from the voice information collecting unit 110.

Figure 3:
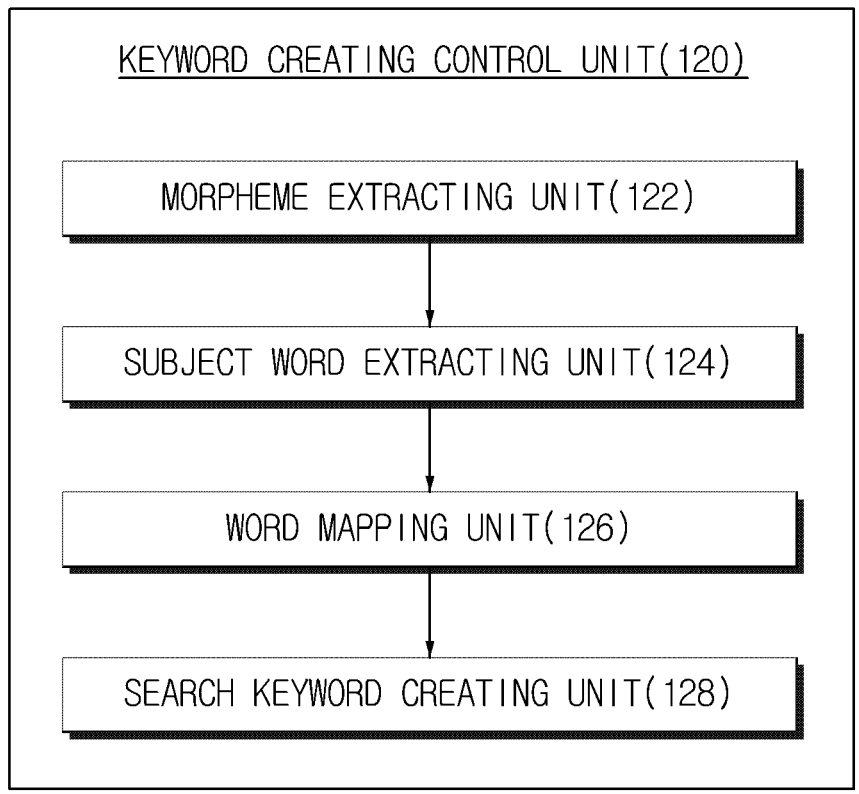
FIG. 3 is a block diagram of a keyword creating control unit in the apparatus for providing contents about conversation according to the exemplary embodiment of the present invention.

FIG. 3 is a block diagram of a keyword creating control unit in the apparatus for providing contents about conversation according to the exemplary embodiment of the present invention.

Describing the keyword creating control unit 120 with reference to FIG. 3, the keyword creating control unit 120 includes a morpheme extracting unit 122, a subject word extracting unit 124, a subject word mapping unit 126, and a search keyword creating unit 128.

The morpheme extracting unit 122 extracts morphemes from the voice information collected by the voice information collecting unit. The morpheme refers to a word or a word component which represents only the grammatical or relational meaning.

In detail, the morpheme extracting unit 122 extracts morphemes from a sentence collected by the voice information collecting unit or voice information composed of a set of words, based on ontology. Ontology may be considered as a kind of dictionary composed of words and relationships. Words relating to specific domains are hierarchically expressed in ontology. Ontology that is a set of vocabularies described in a formal language may be used for inference. Ontology may be used to process web-based knowledge or share knowledge between application programs, or may be reused.

The subject word extracting unit 124 extracts subject words relating to the conversation subject between a user and another person from the morpheme extracted by the morpheme extracting unit 122, based on ontology.

In detail, the subject word extracting unit 124 determines words representing a time, a place, a main body, and a case or area relating to the main body from the extracted morphemes as words relating to the content of the conversation or the subject, and extracts the words as subject words. The subject words may be extracted by finding and inferring the definition, relationship, and property of the conception of words, based on ontology.

The subject word mapping unit 126 maps the subject words extracted by the subject word extracting unit 124 into representative words corresponding to the meanings of the subject words.

In detail, for example, when a word "vacance" is included in the subject words, the word "vacance" is mapped into a representative word "vacation" corresponding to the meaning of the word "vacance". The process of mapping makes it possible to more accurately find the content or subject of conversation between a user and another person by finding the number of times of repetition of the subject words. A technology based on Ontology may be used for selecting a representative word and determining the kind of a word to be mapped to the representative word, or a specific database may also be used.

The search keyword creating unit 128 selects a point word from the mapped words and creates search keywords for contents by using the selected point word, in consideration of at least one of the relationship between the mapped words in the subject words mapped as the representative words by the subject word mapping unit 126 and the frequency in use of the subject words.

The search keyword creating unit 128 creates search keywords for contents by arranging or combining the selected point words.

In detail, the search keyword creating unit 128 may select point words by determining the relationship between the mapped words, based on Ontology, and create search keywords for contents by using the selected point words.

The search keyword creating unit 128 may create keywords primarily based on the subject words that are used many times, in consideration of the frequency in use of the subject words for a predetermined time, in order to reduce the number of subject words, when the number of the mapped subject words is larger than a predetermined number.

When the number of the mapped subject words is smaller than the predetermined number, the search keyword creating unit 128 may create all the subject words as keywords, even considering the frequency in use of the subject words for a unit time.

The search keyword creating unit 128 need not necessarily determine a predetermined number when creating search keywords from the mapped subject words, and may create, as keywords, subject words that were used over a predetermined number of times.

Figure 4:
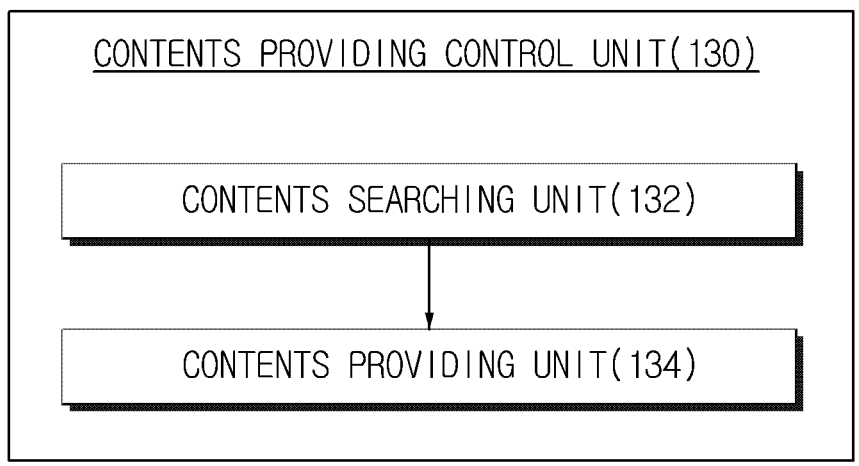
FIG. 4 is a block diagram of a contents providing control unit in the apparatus for providing contents about conversation according to the exemplary embodiment of the present invention.

FIG. 4 is a block diagram of a contents providing control unit in the apparatus for providing contents about conversation according to the exemplary embodiment of the present invention.

Describing the contents providing control unit 130 with reference to FIG. 4, the contents providing control unit 130 includes a contents searching unit 132 and a contents providing unit 134.

The contents searching unit 132 searches contents by using a search engine based on Ontology (searching a knowledge base made by Ontology), by using the search keywords created by the search keyword creating unit 128.

In detail, the contents searching unit 132 searches contents relating to the content or subject of conversation by using the search engine based on Ontology by using the search keywords while the conversation continues between a user and another person.

Searching while conversation continues means that the voice information collecting unit 110 collects voice information from the conversation between the user and the person, the keyword creating control unit 120 continuously creates search keywords by using the continuously collected voice information, and the contents searching unit 132 actively and continuously searches the contents relating to the conversation between the user and the person by using the continuously created keywords.

There may be no search result in accordance with the created keywords, and when there is no search result, the contents searching unit 132 may actively and continuously search contents relating to the conversation by using search keywords that are changed or supplemented as the conversation continues between the user and the person. When there is a result searched by the contents searching unit 132, the contents searching unit 132 stores the search result or transmits the search result to the contents providing unit 134, and continuously searches contents relating to the conversation by using search keywords that are continuously changed or supplemented.

The degree of continuance in continuous collecting of voice information, continuous creating of search keywords, and continuous searching may be the time while the conversation between the user and the person is maintained or within a predetermined time after the conversation is finished.

When there are contents searched by the contents searching unit 132, the contents providing unit 134 asks the user in character or voice whether to be provided with the searched contents, and when the user consents to be provided with the searched contents, the contents providing unit 134 provides the user with the searched contents.

When the user denies or ignores the question about whether to be provided with the searched contents, the contents providing unit 134 may put a question again in character or voice when there are new searched contents and may independently store the search result in preparation for when the user wants the denied or ignored contents later.

The contents providing unit 134 may receive the contents by a way of forwarding the Internet address or the like through which it is possible to receive a file itself containing the contents searched by the contents searching unit 132 or to see or listen to the contents.

In detail, when there are one or more contents searched by the contents searching unit 132, it is possible to show one or more searched contents result on a display or inform the user that there is a plurality of search results, and to ask first the user whether to be informed of the search result in voice. When the user consents to be provided with the contents, the contents providing unit 134 provides the censented consents. When the user does not consent to be provided with the contents, the contents providing unit 134 stands by until contents are newly searched.

The contents providing unit 134 may include a reproducing device, such as a display or a speaker. When the contents providing unit 134 includes a display or a speaker, the contents providing unit 134 may directly reproduce contents, such as video, music, or photographs, for the user.

Alternatively, when the apparatus 100 for providing contents about conversation according to an exemplary embodiment of the present invention is applied to an object that may move or operate by itself, such as a robot or the like, the contents providing unit 134 may provide contents by being connected with a TV, a notebook, a computer, a mobile phone, or the like around the contents providing unit 134. In this case, it is possible to additionally put a question of whether to provide the contents by using devices around the contents providing unit 134.

The apparatus 100 for providing contents about conversation according to an exemplary embodiment of the present invention solves the problem in the related art in that it is difficult to actively provide contents relating to conversation due to technical problems in voice recognition, such as difficulty in voice recognition under an environment with loud noise, difficulty in voice recognition due to unclear pronunciation, and difficulty in continuous voice recognition having large capacity.

That is, the apparatus 100 for providing contents about conversation according to an exemplary embodiment of the present invention may provide contents about conversation even if there is wrong input voice information or non-input voice information, by continuously collecting voice information from conversation between a user and another person, extracting and creating search keywords, searching contents by using the created search keywords, and providing contents relating to the conversation.

The apparatus 100 for providing contents about conversation according to an exemplary embodiment of the present invention may make conversation rich and increase the chance of acquiring a variety of and correct information, by actively searching and providing contents relating to the conversation from the conversation between a user and another person.

According to the apparatus 100 for providing contents about conversation according to an exemplary embodiment of the present invention, it is possible to acquire joys and interest by receiving contents relating to conversation during the conversation between a user and another person.

It is possible to keep conversation smooth by using the contents provided by the apparatus 100 for providing contents about conversation according to an exemplary embodiment of the present invention without stopping the conversation even if it is necessary to search contents relating to the conversation during the conversation.

Figure 5:
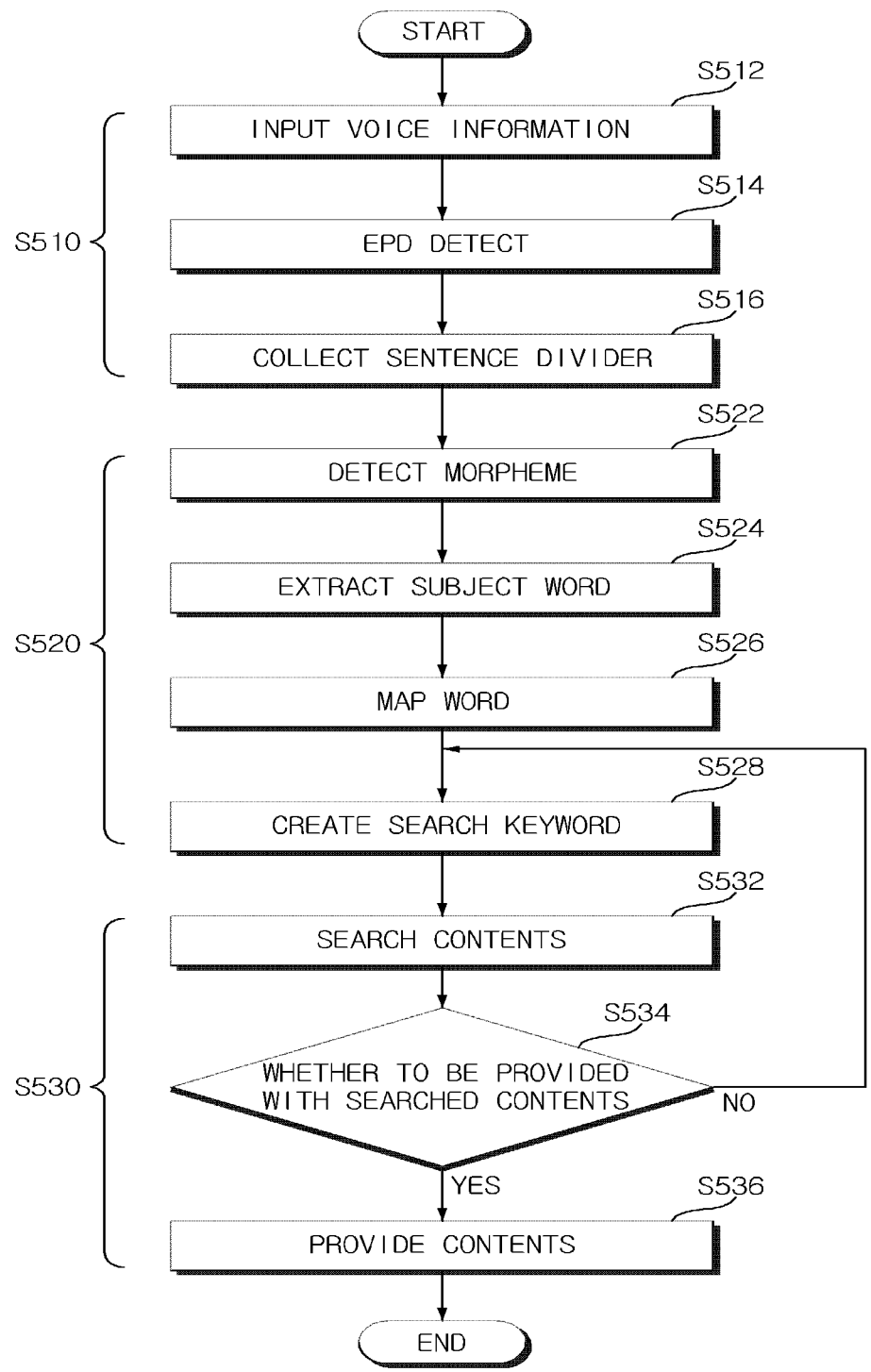
FIG. 5 is a flowchart of a method for providing contents about conversation according to an exemplary embodiment of the present invention.

FIG. 5 is a flowchart of a method for providing contents about conversation according to an exemplary embodiment of the present invention.

Describing the method of providing contents about conversation with reference to FIG. 5, the method of providing contents about conversation includes a voice information collecting step (S510), a keyword creating control step (S520), and a contents providing control step (S530).

The voice information collecting step (S510) is a step in which the voice information collecting unit 110 collects voice information from conversation between a user and another person. The voice information collecting step (S510) includes a voice information input step (S512), and an EPD detecting step (S514), and a sentence divider collecting step (S516).

The voice information collecting step (S512) is a step in which the voice information input unit 112 receives voice information from conversation between the user and the person.

The EPD detecting step (S514) is a step in which the EPD detecting unit 114 detects the end point of the start of utterance from the voice information input in the voice information input step.

The sentence divider collecting step (S516) is a step in which the sentence divider collecting unit 116 divides and collects the voice information in sentence unit in accordance with the detection of the end point of the start of utterance by the EPD detecting unit 114.

The keyword creating control step (S520) is a step in which the keyword creating control unit 120 creates keyword by using the voice information collected in the voice information collecting step (S510). The keyword creating control step (S520) includes a morpheme extracting step (S522), a subject word extracting step (S524), a subject word mapping step (S526), and a search keyword creating step (S528).

The morpheme extracting step (S522) is a step in which the morpheme extracting unit 122 extracts morphemes from the voice information collected in the voice information collecting step (S510).

The subject word extracting step (S524) is a step in which the subject word extracting unit 124 extracts subject words that may be the subject of conversation between the user and the person from the morphemes extracted in the morpheme extracting step (S522), based on Ontology.

The subject word mapping step (S526) is a step in which the word mapping unit 126 maps the subject words extracted in the subject word extracting step (S524) into representative words corresponding to the meanings of the subject words.

The search keyword creating step (S528) is a step in which the search keyword creating unit 128 selects a point word from the mapped words and creates search keywords of contents by using the selected point word, in consideration of at least one of the relationship between the mapped words in the subject words mapped as the representative words in the subject word mapping step (S526) and the frequency in use of the subject words.

The contents providing control step (S530) includes a contents searching step (S532) and a contents providing step (S534).

The contents searching step (S532) is a step in which the contents searching unit 132 searches contents by using the search engine based on Ontology, by using the search keywords created in the search keyword creating step (S528).

The contents providing step is a step of asking the user in character or voice whether to be provided with searched contents (S534) when there are contents searched in the contents searching step (S532) and of providing the searched contents through the contents providing unit 134 when the user consents to be provided with the searched contents (S536).

The method for providing contents about conversation according to an exemplary embodiment of the present invention may make conversation rich and increase the chance of acquiring a variety of and correct information, by actively searching and providing contents relating to the conversation during the conversation between a user and another person.

According to the method for providing contents about conversation according to an exemplary embodiment of the present invention, it is possible to acquire joys and interest by receiving contents relating to conversation during the conversation between a user and another person.

It is possible to keep conversation smooth by using the contents provided by the method for providing contents about conversation according to an exemplary embodiment of the present invention without stopping the conversation even if it is necessary to search contents relating to the conversation during the conversation.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of providing contents about conversation, comprising using voice recognition technology to perform the following steps:
   a voice information collecting step of collecting voice information from conversation between a user and another person;
   a keyword creating control step of creating search keywords by using the collected voice information; and
   a contents providing control step of searching contents by using the created search keywords, and providing the searched contents;
   wherein the keyword creating control step includes a morpheme extracting step of extracting morphemes from the collected voice information;
   wherein the keyword creating control step further includes a subject word extracting step of extracting subject words relating to the conversation subject between the user and the person from the morphemes extracted in the morpheme extracting step, based on Ontology;
   wherein the keyword creating control step further includes a subject word mapping step of mapping the subject words extracted in the subject word extracting step into representative words corresponding to the meanings of the subject words; and wherein the keyword creating control step further includes a search keyword creating step of selecting a point word from the mapped words and creating search keywords for contents by using the selected point word, in consideration of at least one of the relationship between the mapped words in the subject words mapped as the representative words in the subject word mapping step and the frequency in use of the subject words.

2. The method of claim 1, wherein the voice information collecting step includes:

a voice information input step of receiving voice information from the conversation between the user and the person; and an end point detection (EDP) detecting step of detecting the end point of the start of the utterance to find out sections of a sentence unit from the input voice information.

3. The method of claim 2, wherein the voice information collecting step further includes a sentence divider collecting step of dividing the voice information in a sentence unit in accordance with the end point of the start of the utterance detected in the EPD detecting step, and collecting the voice information divided in a sentence unit.

4. The method of claim 1, wherein the contents providing control step includes a contents searching step of searching the contents, based on a search engine based on Ontology, by using the created search keywords.

5. The method of claim 4, wherein the contents providing control step further includes a contents providing step of asking the user in character or voice whether to be provided with the searched contents when there are contents searched in the contents searching step, and of providing the searched contents when the user consents to be provided with the searched contents.

6. An apparatus for providing contents about conversation, comprising:

a voice information collecting unit configured to collect voice information from conversation between a user and another person;

a keyword creating control unit configured to create search keywords by using the collected voice information; and a contents providing control unit configured to search contents by using the created search keywords, and provide the searched contents;

wherein the keyword creating control unit includes a morpheme extracting unit configured to extract morphemes from the collected voice information;

wherein the keyword creating control unit further includes a subject word extracting unit configured to extract subject words relating to the conversation subject between the user and the person from the morphemes extracted by the morpheme extracting unit, based on Ontology;

wherein the keyword creating control unit further includes a subject word mapping unit configured to map the subject words extracted by the subject word extracting unit into representative words corresponding to the meanings of the subject words; and wherein the keyword creating control unit further includes a search keyword creating unit configured to select a point word from the mapped words and create search keywords for contents by using the selected point word, in consideration of at least one of the relationship between the mapped words in the subject words mapped as the representative words by the subject word mapping unit and the frequency in use of the subject words.

7. The apparatus of claim 6, wherein the voice information collecting unit includes:

a voice information input unit configured to receive voice information from the conversation between the user and the person; and an EPD detecting unit configured to detect the end point of the start of the utterance to find out sections of a sentence unit from the input voice information.

8. The apparatus of claim 7, wherein the voice information collecting unit further includes a sentence divider collecting unit configured to divide the voice information in a sentence unit in accordance with the end point of the start of the utterrance detected by the EPD detecting unit, and collect the voice information divided in a sentence unit.

9. The apparatus of claim 6, wherein the contents providing control unit includes a contents searching unit configured to search the contents, based on a search engine based on Ontology, by using the created search keywords.

10. The apparatus of claim 9, wherein the contents providing control unit further includes a contents providing unit configured to ask the user in character or voice whether to be provided with the searched contents when there are contents searched in the contents searching unit, and provide the searched contents when the user consents to be provided with the searched contents.

* * * * *